(12) United States Patent
Kirchmair et al.

(10) Patent No.: US 12,486,630 B2
(45) Date of Patent: Dec. 2, 2025

(54) TRACKED VEHICLE FOR FINISHING THE GROUND WITH A LIFTABLE WORKING ASSEMBLY, IN PARTICULAR A SNOW GROOMING VEHICLE WITH A LIFTABLE TILLER ASSEMBLY

(71) Applicant: PRINOTH S.P.A., Vipiteno (IT)

(72) Inventors: Martin Kirchmair, Vipiteno (IT); Markus Unterholzner, Vipiteno (IT)

(73) Assignee: PRINOTH S.P.A., Vipteno BZ (IT)

( * ) Notice: Subject to any disclaimer, the term of this patent is extended or adjusted under 35 U.S.C. 154(b) by 761 days.

(21) Appl. No.: 17/786,197

(22) PCT Filed: Dec. 18, 2020

(86) PCT No.: PCT/IB2020/062216
§ 371 (c)(1),
(2) Date: Jun. 16, 2022

(87) PCT Pub. No.: WO2021/124270
PCT Pub. Date: Jun. 24, 2021

(65) Prior Publication Data
US 2023/0020247 A1 Jan. 19, 2023

(30) Foreign Application Priority Data

Dec. 19, 2019 (IT) .......................... 102019000024811

(51) Int. Cl.
*E01H 4/02* (2006.01)
*B62D 55/06* (2006.01)
(52) U.S. Cl.
CPC ............... *E01H 4/02* (2013.01); *B62D 55/06* (2013.01)

(58) Field of Classification Search
CPC .. E01H 4/02; E01H 4/023; E01H 5/04; E01H 5/068; E01H 5/061; B62D 55/06; A01B 45/026
See application file for complete search history.

(56) References Cited

U.S. PATENT DOCUMENTS 4,559,725 A * 12/1985 Wieland .................... E01H 4/02
37/197
4,815,223 A * 3/1989 Brandt .................... E01H 5/098
37/224

(Continued)

FOREIGN PATENT DOCUMENTS

| CN | 2818545 Y | 9/2006 |
|---|---|---|
| CN | 106759043 A | 5/2017 |

(Continued)

OTHER PUBLICATIONS

Office Action for Chinese Patent Application No. 202011509164.9 dated Nov. 8, 2024 with translation (10 pages).

(Continued)

*Primary Examiner* — Christopher J Sebesta
*Assistant Examiner* — Blake E Scoville
(74) *Attorney, Agent, or Firm* — Neal, Gerber & Eisenberg LLP

(57) ABSTRACT

A tracked vehicle for finishing the ground, in particular a snow grooming vehicle for finishing ski slopes; the vehicle comprising: a main supporting frame configured for supporting side tracks and an upper cabin; at least one working assembly, such as a tiller assembly, frontally and posteriorly coupled to the main frame and configured for finishing the ground during the movement of the vehicle; a lifting device for the working assembly and configured for selectively switching the working assembly between a first lowered working position, wherein it is in contact with the ground, and a second raised inactive position, wherein it is not in (Continued)

contact with the ground; at least one hydraulic stabilizing device acting on the working assembly and configured so that in the first lowered working position it does not inhibit the movement of the working assembly with respect to the main supporting frame, and in the second raised inactive position it stabilizes the working assembly with greater resistance to movement with respect to the main supporting frame.

20 Claims, 3 Drawing Sheets

(56) References Cited

U.S. PATENT DOCUMENTS

| | | | | |
|---|---|---|---|---|
| 5,046,271 | A * | 9/1991 | Daniels | E01H 5/068 37/231 |
| 5,809,671 | A * | 9/1998 | Sinykin | E01H 4/02 37/219 |
| 2002/0156574 | A1 * | 10/2002 | Fortin | B62D 55/30 701/469 |
| 2003/0051376 | A1 * | 3/2003 | Lassonde | E01H 4/02 37/348 |
| 2003/0154633 | A1 * | 8/2003 | Lassonde | E01H 4/02 37/219 |
| 2007/0180739 | A1 | 8/2007 | Potak | |
| 2011/0147019 | A1 * | 6/2011 | Nusser | A01B 33/024 172/508 |
| 2018/0363260 | A1 * | 12/2018 | Runggaldier | E01H 4/02 |

FOREIGN PATENT DOCUMENTS

| | | |
|---|---|---|
| CN | 207582403 U | 7/2018 |
| WO | WO 01/55511 A2 | 8/2001 |

OTHER PUBLICATIONS

Notification Concerning Submission, Obtention or Transmittal of Priority Document for International Application No. PCT/IB2020/062216 dated Jan. 29, 2021.

International Search Report and Written Opinion for International Application No. PCT/IB2020/062216 dated Mar. 10, 2021.

* cited by examiner

TRACKED VEHICLE FOR FINISHING THE GROUND WITH A LIFTABLE WORKING ASSEMBLY, IN PARTICULAR A SNOW GROOMING VEHICLE WITH A LIFTABLE TILLER ASSEMBLY

PRIORITY CLAIM

This application is a national stage application of PCT/IB2020/062216, filed on Dec. 18, 2020, which claims the benefit of and priority to Italian Patent Application No. 102019000024811, filed on Dec. 19, 2019, the entire contents of which are each incorporated by reference herein.

TECHNICAL FIELD

The technical field related to the present disclosure is the technical field of tracked vehicles for finishing or working the ground. More specifically, certain embodiments of the present disclosure relate to snow grooming vehicles (i.e., tracked vehicles configured for finishing snow-covered ski slopes). It is known to provide suitable stabilizing devices acting on the working assembly to ensure such opposite support configurations.

BACKGROUND

In general, a vehicle for working and finishing the ground comprises a main frame or support bed for tracks mounted on the opposite sides of the frame and a driver's cabin mounted centrally on the support frame. Starting from this general structure, a vehicle for working and finishing the ground usually comprises one or more peculiar operating units or working assemblies connected to the front or rear of the frame. The sector of snow grooming vehicles usually contemplates a rear tiller assembly configured for finishing the snow cover, and a front shovel configured for moving masses of snow along the ski slopes. A third working assembly can be a winch assembly configured to ensure the stability of the snow grooming vehicle on relatively steep slopes and prevent the snow grooming vehicle from slipping if the snow grooming vehicle loses its grip to the snow.

The front or rear working assembly, such as the tiller assembly for snow grooming vehicles, can assume two different configurations with respect to the main frame that supports it. In particular, the tiller assembly for snow grooming vehicles can be selectively switched between two configurations or positions. In a first position, definable as the working position, the front or rear working assembly is in a position that enables it to act against the ground, the snow in the case of snow grooming vehicles, during the movement of the vehicle. In a second position, definable as the inactive position, the front or rear working assembly is in a position that enables it not to act against the ground, the snow in the case of snow grooming vehicles, during the movement of the vehicle. Since the transition from the first to the second position occurs by lifting the working assembly, the first position can also be defined as the lowered position and the second as the raised position. To selectively switch from one position to the other, the vehicle comprises a lifting arm on one side connected to the main frame and on the other side connected to a lifting frame connected to the working assembly. The lifting arm is operated hydraulically and comprises a cylinder housing a moving piston. By moving the piston hydraulically (i.e., by making a fluid (oil) flow in a cylinder chamber), the piston slides relative to the cylinder, raising or lowering the lifting frame and therefore the related working assembly. In the raised and lowered configurations it is preferable that the working assembly is supported with different levels of rigidity. In the lowered position, the working assembly is in contact with the ground and is required to have the ability to adapt to the changing configuration of the ground during the movement of the vehicle. For this purpose, the type of support is therefore required to have relatively low rigidity (i.e., to be able to move in space). Whereas, in the raised position, the working assembly is not in contact with the ground and in this position the support is required to have relatively high rigidity to prevent unwanted movements that could slow down the movement of the vehicle. Certain special devices called stabilizing devices, are capable of tightening the coupling between the working assembly and the main frame in the raised position. Certain known stabilizing devices are made in the form of a pair of cylinders inside which a spring pack is provided. This spring pack is configured so that, due to the lifting of the working assembly (i.e., due to the movement of the piston in the respective cylinder), it generates a reaction force against the raised working assembly. This generated force creates a constraint (in addition to the others present) which has the purpose of preventing the working assembly from moving.

It should be appreciated that the stabilizing devices of the above prior art have some drawbacks, such as the mechanical nature of the stabilizing devices exhibits several critical issues. The first is that these components are often subject to damage and therefore do not ensure appropriate reliability in terms of duration. A second aspect concerns the stress transmitted to the working assembly by these devices, wherein this stress is such as to generate local damage in the coupling area between the stabilizing devices and the working assembly. Lastly, certain known mechanical stabilizing devices do not always operate in a coordinated manner with the lifting device, thereby sometimes generating non-optimal conditions in which the working assembly is raised but not yet stabilized.

SUMMARY

One object of the present disclosure is to provide a tracked vehicle for finishing the ground, in particular a snow grooming vehicle for finishing ski slopes, which is capable of overcoming certain of the drawbacks of certain of the prior art.

In certain embodiments, a vehicle into which the present disclosure can be integrated is a vehicle comprising: a main supporting frame configured for supporting side tracks and an upper cabin; at least one working assembly, such as a tiller assembly in the case of a snow grooming vehicle, frontally and posteriorly coupled to the main frame and configured for finishing the ground (the snow cover in the case of a snow grooming vehicle) during the movement of the vehicle; a lifting device for the working assembly and configured for selectively switching the working assembly between a first lowered working position, wherein it is in contact with the ground, and a second raised inactive position, wherein it is not in contact with the ground.

It should be appreciated that although the present disclosure can be extended to other contexts and not only to snow grooming vehicles, for the sake of simplicity the following description will only refer to snow grooming vehicles. However, this exemplification does not limit the scope of protection of the present disclosure.

The term "finishing" relates to performing certain actions on the ground, on the snow cover in the case of snow grooming vehicles, during the movement of the vehicle to give the ground a desired configuration. To this end, these vehicles comprise a main frame to which a working assembly is coupled, a tiller assembly in the case of snow grooming vehicles, comprising at least one device configured for working the ground. In the case of snow grooming vehicles, the tiller assembly comprises a tiller configured to act by tilling the snow cover, and a finisher configured to give the (optionally tilled) snow a particular configuration. In these tracked vehicles, the working assembly is configured to assume two positions with respect to the main frame (i.e., a first lowered working position), in which it acts against the ground, and a second raised inactive position, in which it is not in contact with the ground and the vehicle can move more freely. In the first lowered position, the working assembly must be supported so that it is able to follow the shape of the ground to be finished with the least possible resistance. In other words, in the first lowered position, the working assembly must be supported by the main frame in a non-rigid manner. Whereas, in the second raised position, the working assembly must be supported by the main frame in a rigid manner to prevent unwanted movements of the working assembly during the movement of the vehicle.

With regard to the above, reference to "side" and "frontally/posteriorly" relates to the forward direction of movement of the tracked vehicle.

For the purposes of the present disclosure, the term "ground" does not only mean the surface layer of the Earth's surface in the geological sense, it generally means the surface with which the vehicle cooperates during its movement. Therefore, since certain applications of the present disclosure relates to snow grooming vehicles, the ground according to the present disclosure is mainly a snow and/or ice cover. However, in other applications, the ground can be a grassy or muddy surface in forest or farming areas.

According to a first aspect of the present disclosure, the vehicle further comprises at least one hydraulic stabilizing device acting on the working assembly. This hydraulic stabilizing device is configured so that in the first lowered working position it does not inhibit the movement of the working assembly with respect to the main supporting frame. In this position, the working assembly must be as free as possible to move to better adapt to the changing configuration of the ground to be finished. By way of example, the working assembly can perform roll rotations (i.e., around the axis of the forward movement) and pitch rotations (around the transverse axis). On the contrary, the hydraulic stabilizing device of the present disclosure is also configured so that in the second raised inactive position it stabilizes the working assembly (i.e., it prevents the movement or generates greater resistance to the movement of the working assembly with respect to the main supporting frame). The term "stabilized" has the meaning of inhibiting or opposing the typical movements allowed to the working assembly when it acts against the ground.

The innovative provision of stabilizing devices of the hydraulic type facilitates the overcoming of certain of the drawbacks of certain of the prior art which provides stabilizing devices exclusively mechanical in nature. As such, the hydraulic drive ensures a relatively longer life of the device under safety conditions, reduces the stress transmitted to the working assembly, and has improved reaction times.

According to certain embodiments of the disclosure, the hydraulic stabilizing device is a double-acting hydraulic actuator; such as a double-acting hydraulic actuator comprising a cylinder which houses a moving piston operated by a driving fluid selectively fed into a main chamber of the cylinder. According to these embodiments, the aforesaid hydraulic stabilizing device comprises two ends (one of which is the extension of the piston) coupled to the working assembly and to a lifting frame, respectively. The lifting device connected to the main frame acts on the opposite side of the lifting frame. When the working assembly is lifted (i.e., when the lifting device that lifts the lifting frame (and the working assembly by dragging) is operated), the driving fluid is fed into the main chamber of the stabilizing device. Initially, the piston is moved until it reaches the end of travel, which pressurizes the main chamber. In this way, the structure becomes relatively very rigid, resulting in the tightening of the working assembly as well, thereby inhibiting its previously allowed movements.

According to certain embodiments of the present disclosure, the aforementioned stabilizing device can comprise a second chamber configured to enable relatively small adjustments when the main chamber is full and under pressure.

In certain embodiments, the lifting device is also a hydraulic actuator comprising a cylinder housing a moving piston driven by a fluid. In this case, the operations of the lifting device and of the stabilizing device can be coordinated by providing a hydraulic circuit that connects the lifting device to the stabilizing device.

It should be appreciated that different ways can also be provided for operating the two hydraulic devices in a coordinated manner.

If the vehicle is a snow grooming vehicle, the working assembly can comprise a tiller and a finishing runner or finisher.

BRIEF DESCRIPTION OF THE DRAWINGS

Further features and advantages of the present disclosure will be apparent from the following description of a non-limiting embodiment thereof, with reference to the figures of the accompanying drawings, wherein.

DETAILED DESCRIPTION

With reference to the figures, certain embodiments of the present disclosure are directed to a snow grooming vehicle equipped with a tiller assembly that can be lifted by a pair of stabilizing devices configured to stabilize (i.e., lock in space) the tiller assembly when it is raised.

Figure 1:
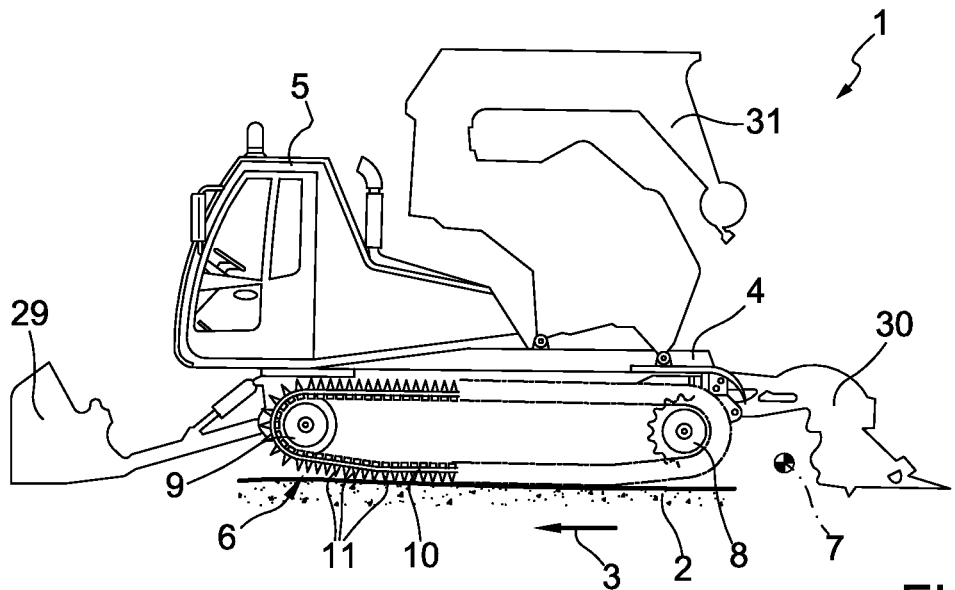
FIG. 1 shows a schematic side elevation view of a snow grooming vehicle for finishing ski slopes.

Referring to FIG. 1, this figure shows a schematic view of a snow grooming vehicle 1 (i.e., a tracked vehicle which can be equipped with the technical solution described herein). This snow grooming vehicle 1 is a tracked vehicle and is motorized to move on the ground 2 in a direction of movement 3. As previously indicated, the term "ground" refers to a multiplicity of different surfaces on which the vehicle travels. Usually, that is, during normal use, the ground in this case is a snow cover, but nevertheless the ground could be a different contact surface, even for example a hard surface. As such, usually, the snow grooming vehicle at certain times is on the snow in an ideal condition for its operation and at other times it can be on an icy or hard surface, and the present disclosure also extends to other vehicles configured for finishing other types of ground. It should be appreciated that the direction of movement 3 can also be different from the indicated direction (i.e., for example, the snow grooming vehicle 1 can also move in reverse). The snow grooming vehicle 1 in FIG. 1 comprises a rear tiller assembly 30 (i.e., the "working assembly") configured for working the snow cover 2, a front shovel 29 configured to move masses of snow, and a winch assembly 31. The snow grooming vehicle 1 in FIG. 1 further comprises a support or main frame 4, a driver's cabin 5 mounted on the support frame 4 and two tracks 6 mounted on opposite sides of the support frame 4. Each track 6 comprises a plurality of belts 10 looped between a front wheel 9 and a rear wheel 8. Furthermore, each track 6 comprises a plurality of transverse bars 11 fixed to the belts 10. The direction of movement of the belts 10 defines the direction that will be indicated in the following description as the longitudinal direction 3, whereas the axes of rotation of the wheels 8, 9 define the transverse direction 7 orthogonal to the longitudinal direction 3.

Figure 2:
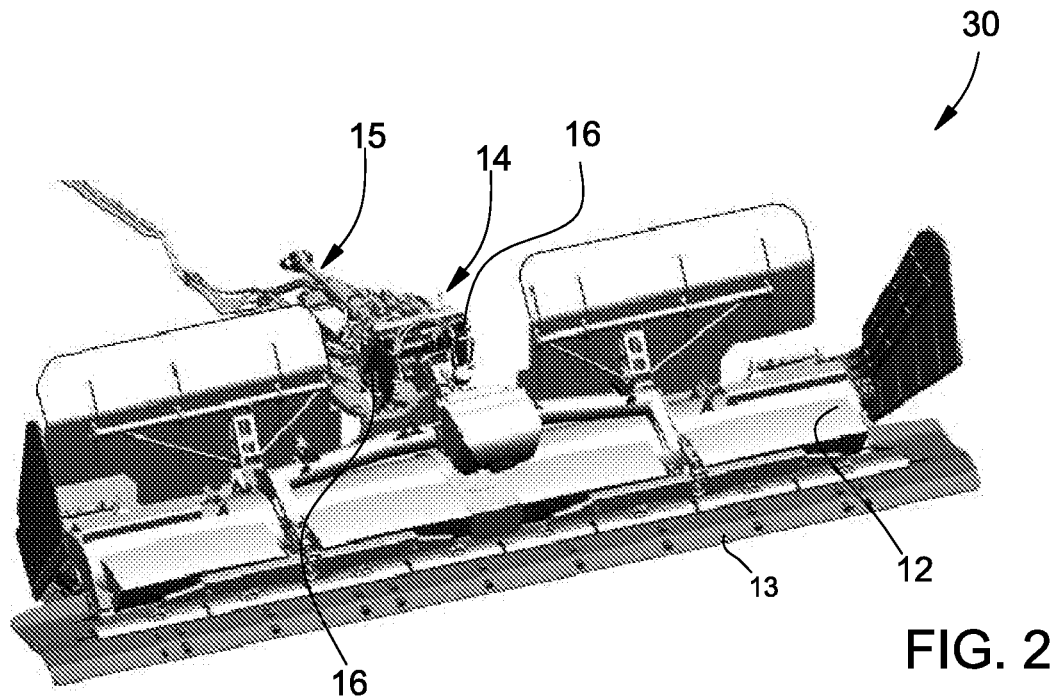
FIG. 2 is an enlarged perspective view of some components of the snow grooming vehicle in FIG. 1, in this case, the tiller assembly with the frame and the lifting device, as well as a pair of stabilizing devices according to the present disclosure with the rest of the vehicle omitted for convenience.

FIG. 2 is an enlarged perspective view of the tiller assembly 30 of the snow grooming vehicle in FIG. 1. In this example, the tiller assembly comprises a tiller device 12 and a finisher device 13. Further constructive details of the tiller assembly 30 are omitted because the composition of the tiller assembly 30 is not a restriction on the present disclosure. In other words, the tiller assembly can be of any type, as it can also be a working assembly other than a tiller assembly. The only restriction required of the working assembly for it to be integrated into the present disclosure is that it should be selectively liftable with respect to the ground. To this end, the tiller assembly 30 in FIG. 2 is connected to or comprises a lifting frame 14 on the opposite side with respect to the runner 13 and through which it is coupled to the main frame 4. Between the main frame 4 and the lifting frame 14 there is a lifting arm 15, that is a device configured to lift the tiller assembly 30. A pair of stabilizing devices 16 are located between the lifting frame and the tiller assembly 30.

Figure 3:
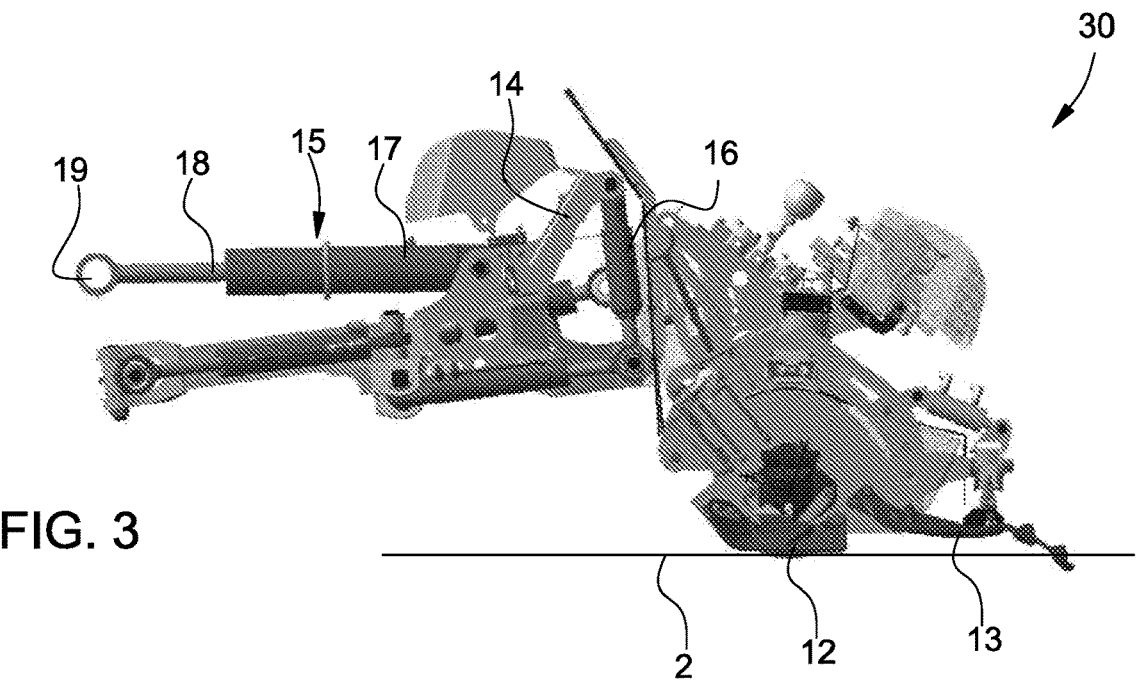
FIGS. 3 and 4 show two different positions of the tiller assembly, with respect to the main frame, in a lowered working position and in a raised inactive position, respectively.
Figure 4:
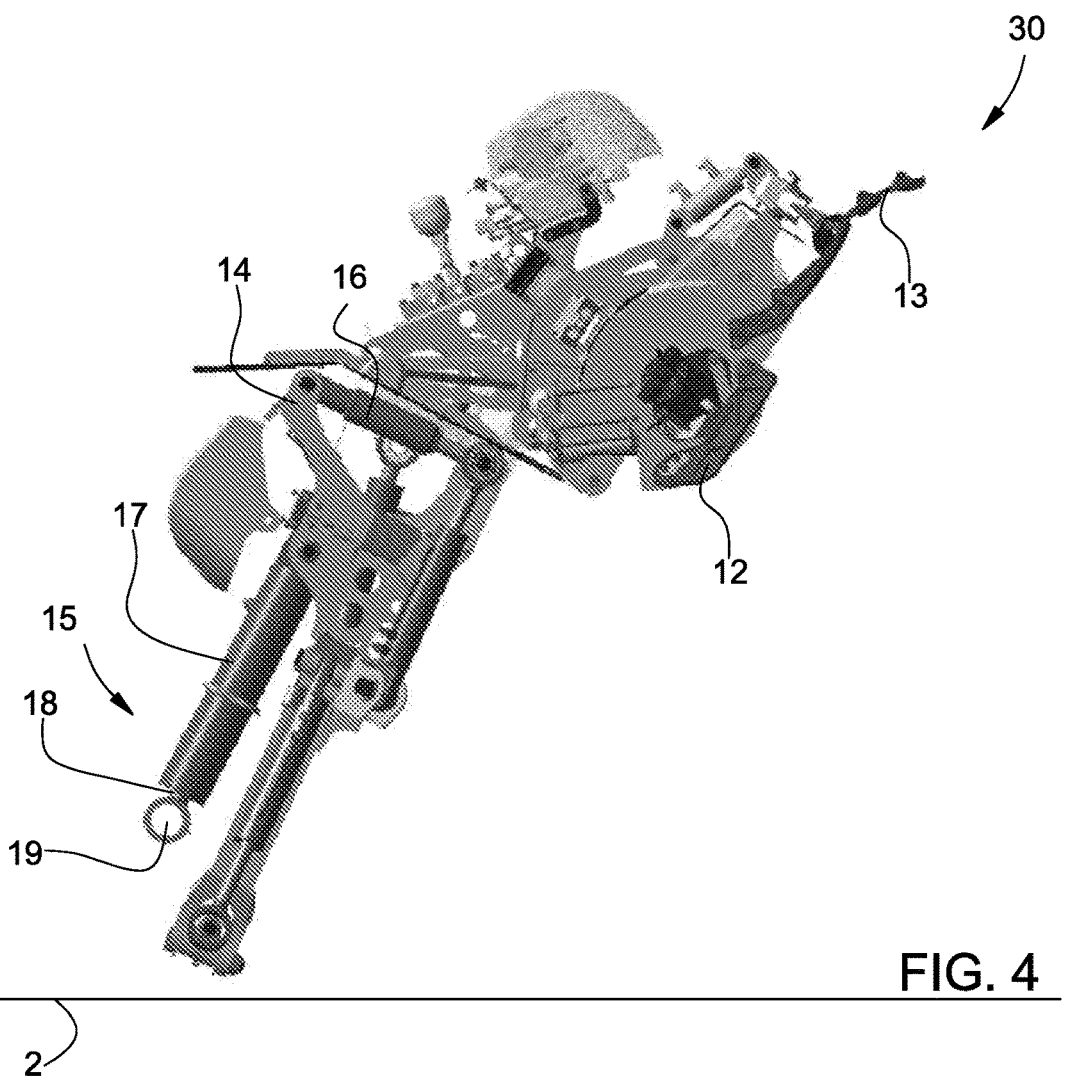

FIGS. 3 and 4 show two different positions of the tiller assembly 30 with respect to the main frame (and more specifically with respect to the ground 2). Respectively, FIG. 3 shows a lowered working position of the tiller assembly 30 in which the tiller 12 and the finisher 13 act against the ground 2 (i.e., the snow cover). FIG. 4 shows a raised inactive position of the tiller assembly 30 in which the tiller 12 and the finisher 13 are in such a position as not to collaborate with the ground 2. In this example, the lifting device 15 is a hydraulic actuator configured to lift the tiller assembly 30 by rotation around an axis parallel to the transverse direction 7. According to FIG. 3, the lifting device 15 comprises a cylinder 17 which houses a moving piston 18 driven by a fluid fed into the cylinder. The axis of rotation of the lifting of the tiller assembly 30 corresponds to the coupling point between the lifting device 15 and the main frame 4. This point is indicated by reference number 19. As can be seen in FIG. 4, the piston 18 sits deeper in the cylinder 17 due to its operation and to the lifting of the tiller assembly 30. The stabilizing devices 16 are configured so that in the first lowered working position in FIG. 3 the movement of the tiller assembly 30 with respect to the main supporting frame is not inhibited, so it can "freely" rotate around the longitudinal axis 3 and the transverse axis 7. In this position, the tiller assembly 30 must be as free as possible to move to better adapt to the changing configuration of the snow cover 2 to be finished. Whereas, in FIG. 4, the stabilizing devices 16 act on the tiller assembly 30 so as to "stabilize" its movements (i.e., they are configured to prevent the movement or generate greater resistance to the movement of the tiller assembly 30 with respect to the main supporting frame 4). Therefore, the term "stabilized" has the meaning of inhibiting or opposing the typical movements enabled to the tiller assembly 30 when the tiller assembly acts against the ground 2.

Figure 5:
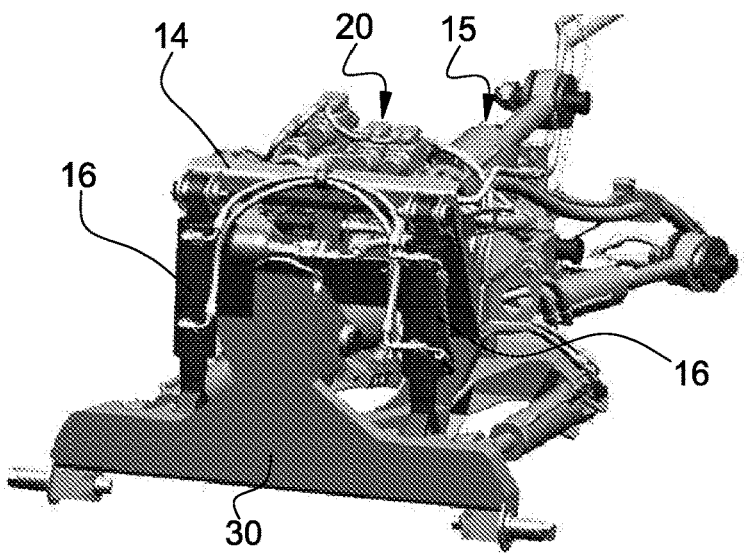
FIG. 5 shows an enlarged view of some components of FIG. 2; in this case, the frame and the lifting device, as well as a pair of stabilizing devices according to the present disclosure.

FIG. 5 shows an enlarged view of some components of FIG. 2. In particular, in FIG. 5, a large part of the tiller assembly 30 has been removed and is only shown with a portion of coupling to the stabilizing devices 16. According to the main aspect of the present disclosure, the stabilizing devices 16 are of the hydraulic type and FIG. 5 also shows a hydraulic circuit 20 configured to feed the stabilizing devices 16. In this example, the hydraulic circuit 20 connects the lifting device 15 to the stabilizing devices 16 (both operated hydraulically) so that their operation is coordinated.

Figure 6:
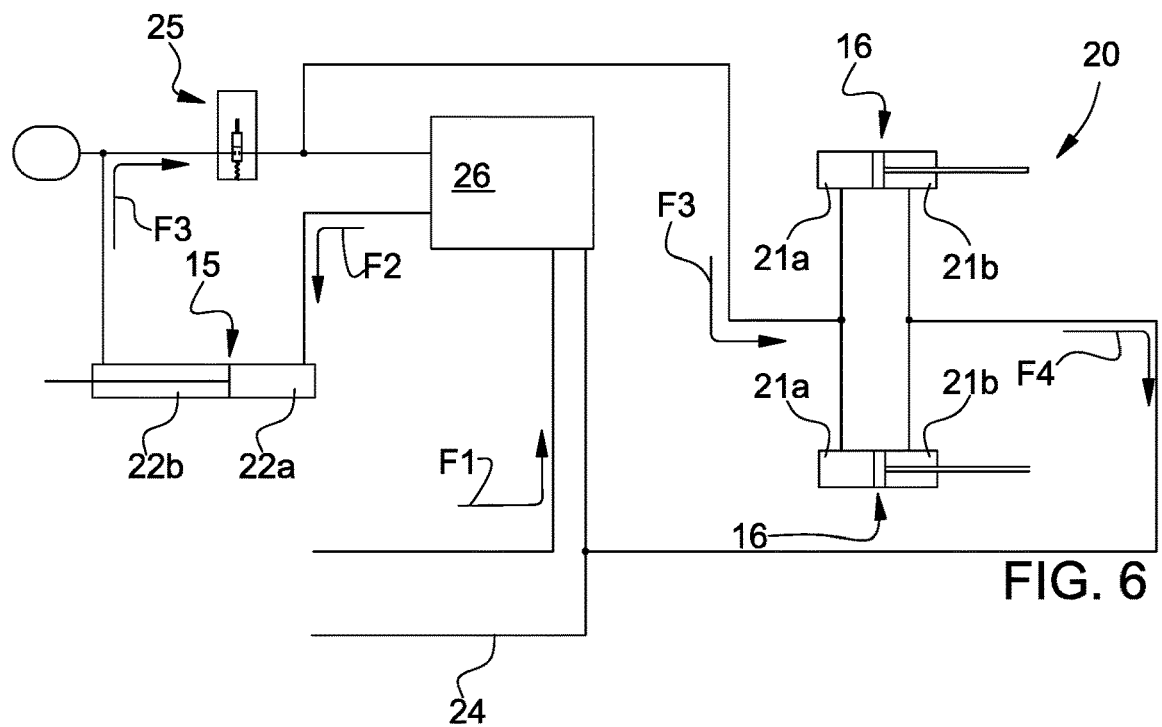
FIG. 6 shows a schematic view of a hydraulic circuit for the coordinated operation of the lifting device and the stabilizing devices.

FIG. 6 shows a schematic view of the hydraulic circuit 20 of the previous figure. As will be further detailed in the description of the following figure, the stabilizing devices 16 of this example are double-acting hydraulic actuators. That is, each stabilizing device 16 comprises a cylinder 32 which houses a moving piston 33 which identifies in the cylinder 32 a main chamber 21a and a secondary chamber 21b configured to feed or vent the pressurized fluid (for example, oil). The secondary chamber is the one that houses part of the rod of the piston 33. Similarly, the lifting device 15 also identifies a main chamber 22a and a secondary chamber 22b. As can be seen in FIG. 6, the large chambers 21a of the two stabilizing devices 16 are connected to each other and are also connected to the small secondary chamber 22b of the lifting device 15 of the lifting frame 14. Such a connection provides that, during the lifting stroke, the oil present in the secondary chamber 22b of the lifting device 15 flows automatically into the main chambers 21a of the stabilizing devices 16 so as to stabilize the tiller assembly 30. The secondary chambers 21b of the stabilizing devices 16 are connected to a tank indicated with the line 24 in FIG. 6. In the working position of FIG. 3, the main chambers 21a of the stabilizers 16 are emptied so that the tiller assembly can follow the ground as best as possible. FIG. 6 also shows a first valve 25 and a second valve 26 configured to control the flow of oil between the tank 24 and the hydraulic actuators 15 and 16.

For the future, it can also be controlled with a separate valve or a hydraulic system. Arrow F1 indicates the flow of oil from the tank to the valve 26; arrow F2 indicates the flow of oil from the valve 26 to the main chamber 22a of the lifter 15; arrow F3 indicates the flow of oil from the secondary chamber 22b of the lifter 15 to the main chambers 21a of the stabilizing devices 16; arrow F4 indicates the flow of oil from the secondary chambers 21b of the stabilizing devices 16 to the tank 24.

Figure 7:
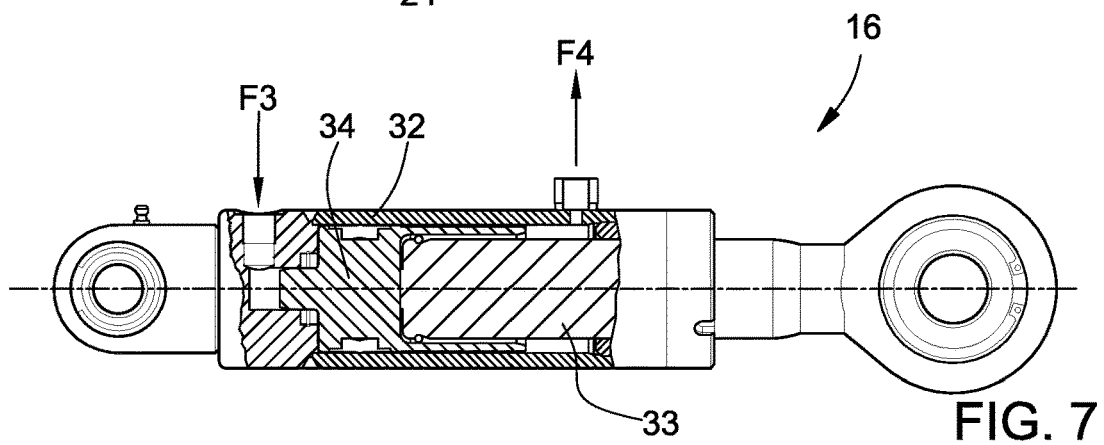
FIG. 7 shows a sectional view of a possible embodiment of a stabilizing device according to the present disclosure.

Lastly, FIG. 7 shows a sectional view of a possible embodiment of a stabilizing device 16 according to the present disclosure. This figure shows in detail the feeding F3 of the oil into the main chamber 21a and the discharge F4 of the oil from the secondary chamber 21b. This figure also shows that around the head of the piston 33 there is a pin 34 which acts as a damping element in the transition between activation and deactivation of the stabilizing device 16.

It should be appreciated that both the lifting device 15 and the stabilizing devices 16 comprise ends configured to be coupled to the respective frames, so as to enable correct operation. In the example shown, these ends are joints.

Lastly, it is clear that modifications and variations may be made to the disclosure described herein without departing from the scope of the appended claims. That is, the present disclosure also covers embodiments that are not described in the detailed description above as well as equivalent embodiments that are part of the scope of protection set forth in the claims. Accordingly, various changes and modifications to the presently disclosed embodiments will be apparent to those skilled in the art.

The invention claimed is:

1. A tracked vehicle comprising:
    a main frame supporting a plurality of tracks and an upper cabin;
    a working assembly coupled to the main frame and configured to finish a ground surface during a movement of the tracked vehicle;
    a lifting device configured to selectively switch the working assembly between a working position in which the working assembly is in contact with the ground surface and an inactive position in which the working assembly is not in contact with the ground surface; and
    a hydraulic stabilizing device separate from the lifting device and configured to act on the working assembly such that when the working assembly is in the working position, the hydraulic stabilizing device does not inhibit movement of the working assembly relative to the main frame, and when the working assembly is in the inactive position, the hydraulic stabilizing device inhibits movement of the working assembly, via a higher movement resistance, along a longitudinal axis relative to the main frame and along a transverse axis relative to the main frame.

2. The tracked vehicle of claim 1, wherein the hydraulic stabilizing device comprises a double-acting hydraulic actuator.

3. The tracked vehicle of claim 2, wherein the double-acting hydraulic actuator comprises a cylinder which houses a moving piston, a main chamber selectively filled and emptied with a driving fluid provided inside the cylinder.

4. The tracked vehicle of claim 3, wherein the cylinder houses a second chamber configured to enable adjustments when the main chamber is filled with the driving fluid.

5. The tracked vehicle of claim 1, wherein the lifting device comprises a hydraulic actuator comprising a cylinder which houses a moving piston driven by a fluid.

6. The tracked vehicle of claim 5, wherein an operation of the lifting device is coordinated with an operation of the hydraulic stabilizing device.

7. The tracked vehicle of claim 6, further comprising a hydraulic circuit connecting the lifting device to the hydraulic stabilizing device such that the operation of the hydraulic stabilizing device is connected to the operation of the lifting device.

8. The tracked vehicle of claim 1, further comprising a lifting frame between the main frame and the working assembly, wherein the lifting device extends between the main frame and the lifting frame, and the hydraulic stabilizing device extends between the lifting frame and the working assembly.

9. The tracked vehicle of claim 8, wherein the lifting frame is integral with the working assembly.

10. The tracked vehicle of claim 1, which comprises a snow grooming vehicle.

11. The tracked vehicle of claim 10, wherein the working assembly comprises a tiller and a finisher.

12. A system comprising:
    a tiller assembly coupleable to a main frame of a snow grooming vehicle and configured to finish a ground surface during a movement of the snow grooming vehicle;
    a lifting device configured to selectively switch the tiller assembly between a working position in which the tiller assembly is in contact with the ground surface and an inactive position in which the tiller assembly is not in contact with the ground surface; and
    a hydraulic stabilizing device separate from the lifting device and configured to act on the tiller assembly such that when the tiller assembly is in the working position, the hydraulic stabilizing device does not inhibit movement of the tiller assembly relative to the main frame, and when the tiller assembly is in the inactive position, the hydraulic stabilizing device inhibits movement of the tiller assembly, via a higher movement resistance, along a longitudinal axis relative to the main frame and along a transverse axis relative to the main frame.

13. The system of claim 12, wherein the hydraulic stabilizing device comprises a double-acting hydraulic actuator.

14. The system of claim 13, wherein the double-acting hydraulic actuator comprises a cylinder which houses a moving piston, and a main chamber selectively filled and emptied with a driving fluid provided inside the cylinder.

15. The system of claim 14, wherein the cylinder houses a second chamber configured to enable adjustments when the main chamber is filled with the driving fluid.

16. The system of claim 12, wherein the lifting device comprises a hydraulic actuator comprising a cylinder which houses a moving piston driven by a fluid.

17. The system of claim 16, wherein an operation of the lifting device is coordinated with an operation of the hydraulic stabilizing device.

18. The system of claim 17, further comprising a hydraulic circuit connecting the lifting device to the hydraulic stabilizing device such that the operation of the hydraulic stabilizing device is connected to the operation of the lifting device.

19. The system of claim 12, further comprising a lifting frame between the main frame and the tiller assembly, wherein the lifting device extends between the main frame and the lifting frame, and the hydraulic stabilizing device extends between the lifting frame and the tiller assembly.

20. The system of claim 19, wherein the lifting frame is integral with the tiller assembly.

\* \* \* \* \*